Aug. 13, 1957 G. JAEGER 2,802,277
GEAR TESTING APPARATUS
Filed April 5, 1955 3 Sheets-Sheet 1
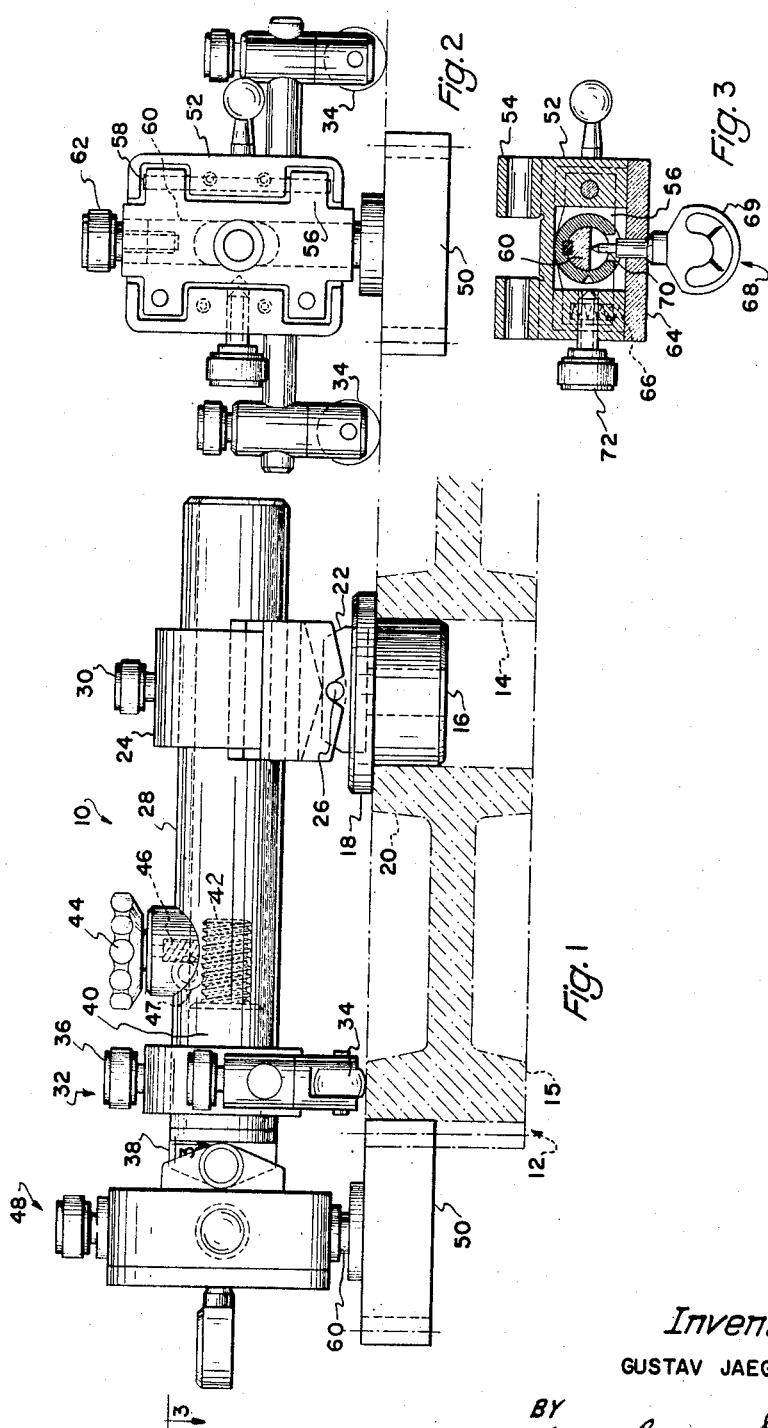
Inventor:
GUSTAV JAEGER
BY Mead, Browne, Schuyler & Beveridge
ATTORNEYS

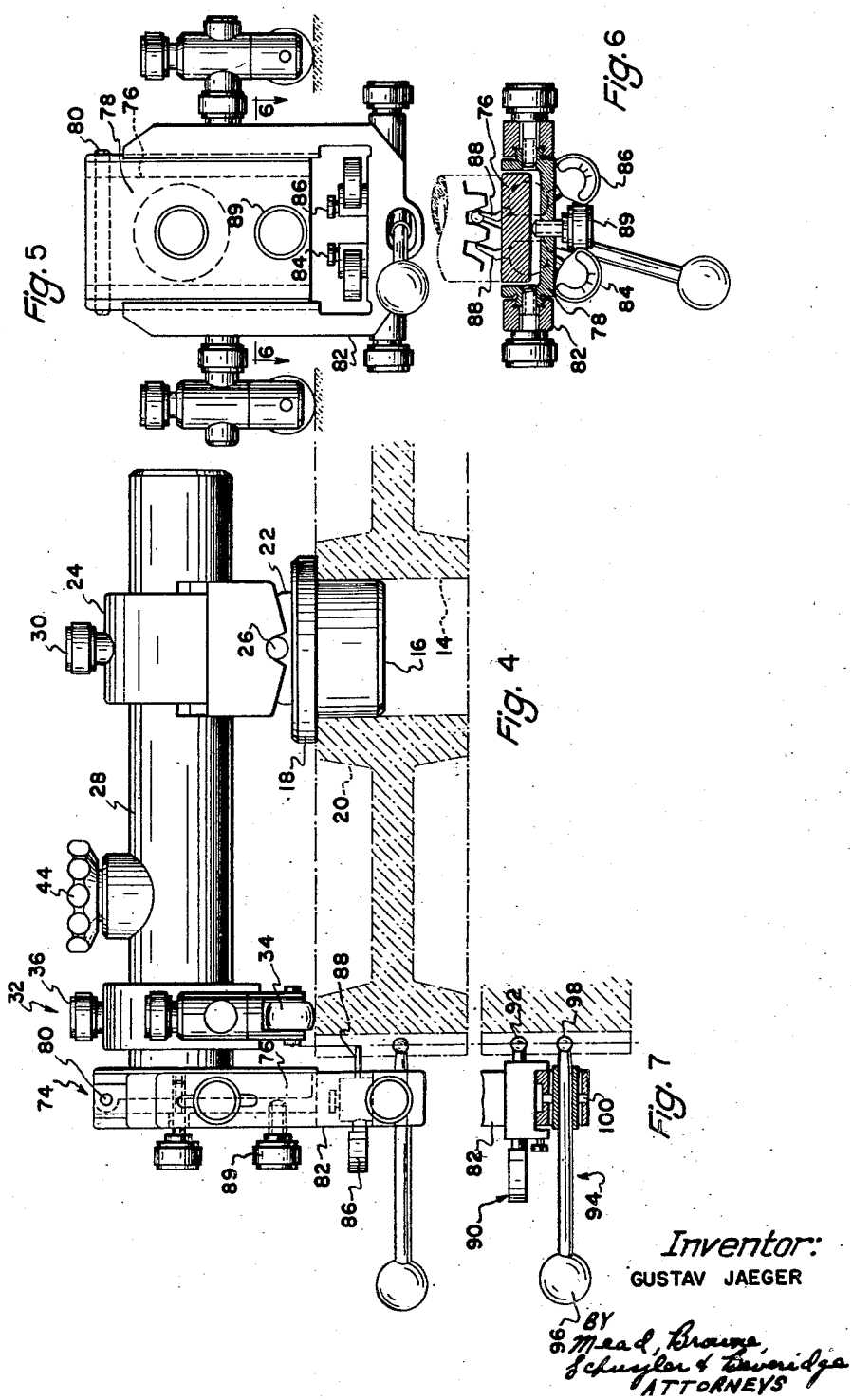

Aug. 13, 1957 G. JAEGER 2,802,277
GEAR TESTING APPARATUS
Filed April 5, 1955 3 Sheets-Sheet 3
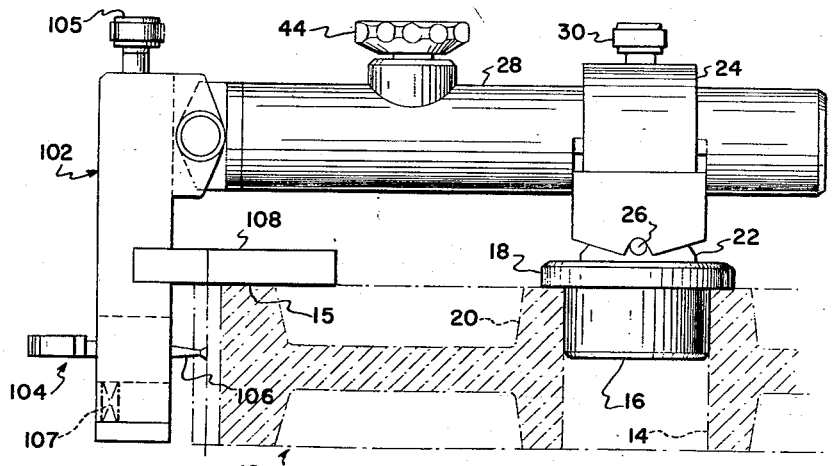
Fig. 8
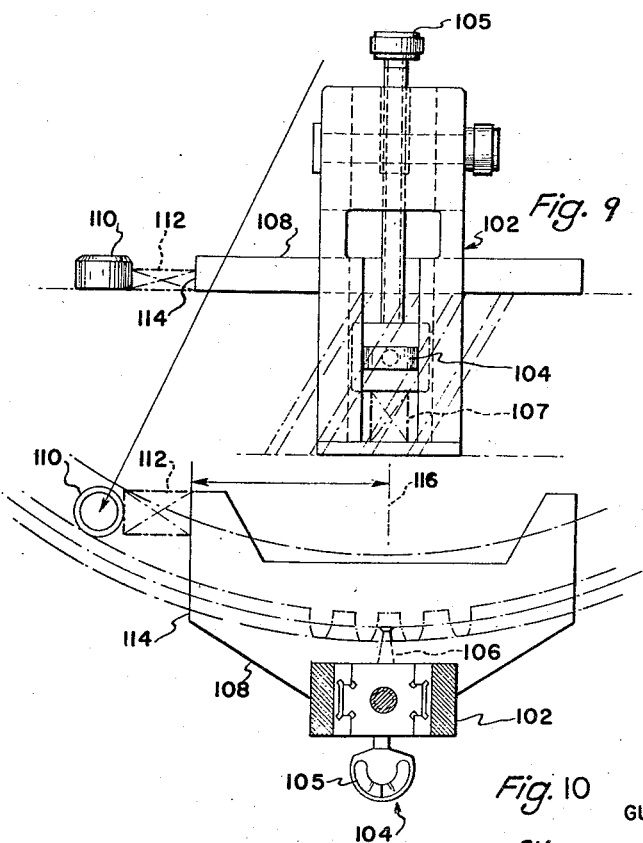
Fig. 9
Fig. 10
Inventor:
GUSTAV JAEGER
BY Mead, Browne, Schuyler
& Beveridge
ATTORNEYS United States Patent Office 2,802,277
Patented Aug. 13, 1957

2,802,277

GEAR TESTING APPARATUS

Gustav Jaeger, Huckeswagen, Rhineland, Germany, assignor to W. Ferd. Klingelnberg Sohne, Remscheid-Berghausen, Germany, a corporation of Germany Application April 5, 1955, Serial No. 499,481

Claims priority, application Germany April 8, 1954

1 Claim. (Cl. 33—179.5)

This invention relates to apparatus for testing gears and more particularly to an apparatus supported by the gear being tested and adapted to receive a plurality of accessory testing devices for use in performing different gear testing operations.

In the inspection of gears, it is important not only that the testing elements be accurately positioned at a specified distance from the gear axis, but also that there be no canting of the testing elements relative to the axis of the gear. It is also desirable that the testing apparatus be adjustable to permit use of the same testing apparatus over a range of different gear sizes.

Accordingly, it is an object of this invention to provide a radially adjustable apparatus for supporting gear testing elements at a specified radial distance from the gear axis and without canting of the test elements relative to the axis of the gear.

It is another object of this invention to provide a gear testing apparatus of a type which is suitable for use with either large or small gears.

It is still another object of this invention to provide a gear testing apparatus which permits exact test measurements to be made in any one of a plurality of test operations.

It is a further object of this invention to provide a gear testing apparatus which is supported by the gear being tested, both at the bore of the gear and also at the outer rim of the gear.

In achievement of these objectives, this invention provides a gear testing apparatus including a radially extending support member which is mounted for pivotal movement about the axis of the gear bore on a spigot positioned in the bore of the gear. A carrier member is attached to the outer portion of the radially extending support member and is adapted to move circumferentially along the upper surface of the rim of the gear. A holder member for a test element is adjustably mounted on the radial support member adjacent the outer periphery of the gear and is adapted to interchangeably receive accessory devices for performing various testing operations. The assembly including the radially extending support member, the carrier member, and the test element holder at the outer end of the radially extending support member are adapted to move circumferentially about the axis of the bore of the gear in connection with the various testing operations.

Further objects and advantages of the invention will become apparent from the following description taken in conjunction with the accompanying drawings in which:

Fig. 1 is a side elevation view of the gear testing apparatus including the accessory device used for the two-flank rolling test;

Fig. 2 is a front elevation view of the apparatus shown in Fig. 1 with the front plate removed from the accessory device;

Fig. 3 is a view in horizontal section along line 3—3 of Fig. 1;

Fig. 4 is a side elevation view, similar to Fig. 1, of the gear testing apparatus including the accessory device used for checking the gear pitch;

Fig. 5 is a front elevation view of the apparatus of Fig. 4;

Fig. 6 is a view in horizontal section along line 6—6 of Fig. 5;

Fig. 7 is a fragmentary view in side elevation of a modified form of accessory device used for checking the concentricity of the gear;

Fig. 8 is a side elevation view of the gear testing apparatus with the accessory device used for checking the helix of the gear;

Fig. 9 is a front elevation view of the apparatus of Fig. 8; and

Fig. 10 is a top plan view of the apparatus of Fig. 8.

Referring now to the drawings, and more particularly to Figs. 1–3, inclusive, the gear testing apparatus of the invention is generally indicated at 10 and is supported upon a gear 12 having a central bore 14 and an outer rim 15. Gear 12 is the gear which is being tested. A spigot 16 is received within the bore 14 of the gear, spigot 16 having an outer flange portion 18 which rests upon the surface of the hub 20 of the gear. A second spigot 22 is supported by spigot 16 and a holder generally indicated at 24 is connected to spigot 22 by the joint connection indicated at 26.

A radially extending support member or tube 28 extends through holder 24 and is radially movable in holder 24. Tube 28 is held in a fixed position with respect to holder 24 by means of the fastening element 30, which may be a set screw. Tube 28 is supported adjacent its radially outer end by a holder member generally indicated at 32 which is disposed at the same radial distance from the central axis of the bore as the rim 15 of the gear. Carrier 32 includes two roller members 34 which are adapted to roll on the upper surface of the rim of the gear. Holder 32 is held in a fixed position with respect to tube 28 by means of the fastening element 36 which may be a set screw, for example.

To serve as a support for various accessory testing devices used with the apparatus, a holder 38 is positioned at the outer end of tube 28 and includes a stud member 40 which projects into the hollow interior of tube 28. At its inner end, stud 40 is provided with a threaded portion 42. A fine adjustment of the radial position of holder 38 is obtained by means of a hand wheel 44 which projects into the interior of hollow tube 28 adjacent the threaded end portion 42 of holder 38. Hand wheel 44 carries a vertically disposed worm gear 46 which drives the threaded end 42 through intermediate gear 47 to produce a fine axial movement of holder 38 into or out of tube 28.

In the view shown in Figs. 1–3, an accessory device generally indicated at 48 is supported at the outer end of holder 38 for making the two-flank rolling test in which a master gear generally indicated at 50 is circumferentially moved in meshing engagement with the test gear 12. Accessory device 48 includes a stationary housing 52 having trunnions 54 which are connected to the holder 38. Housing 52 is provided with a flap or gate member 56 which is pivotally movable with respect to the stationary housing portion 52 about the vertical axis 58. Axis 58 is displaced from, but parallel to, the axis of the vertical shaft 60 of master gear 50. Shaft 60 of master gear 50 extends upwardly into the interior of pivoted flap 56. The upper end of shaft 60 is connected to a threaded adjusting member 62 carried by pivoted flap 56. Adjusting member 62 may be rotated to adjust the vertical height of shaft 60 and, consequently, of master gear 50. A vertical plate member 64 is attached to the front portion of the stationary casing 52 forwardly of the front surface of pivoted flap 56. The spacing between the inner surface of plate 64 and the outer surface of pivoted flap 56 is such as to permit a limited degree of pivotal movement of flap 56 about its vertical axis 58. A biasing spring member 66 is interposed between the front plate 64 and the pivoted flap 56 to urge the flap 56 inwardly and consequently to urge the master gear 50 into play-free engagement with test gear 12.

A dial indicator generally indicated at 68 is supported by front plate 64 and has its dial portion 69 disposed forwardly of the outer surface of plate 64. The sensing element 70 of indicator 68 which is relatively movable with respect to the dial portion of the indicator projects into engagement with the vertical shaft 60 and is subjected to movement whenever any movement of shaft 60 occurs due to center distance variations between test gear 12 and master gear 50. Movements of the sensing element 70 are indicated upon the dial indicator 68 to show the center distance variations between the test gear 12 and the master gear 50 when master gear 50 is turned about the spigot 16 as an axis. The screw 72 is used for locking the pivoted flap member 56 against movement when desired.

In the views shown in Figs. 4, 5 and 6, the accessory device generally indicated at 74 is connected to the outer end of tube 28 for making a single error check, such as measuring the pitch of the gear. Attachment 74 comprises a pivotally mounted flap member 78 which is movable about a horizontal pivotal axis 80. Flap 78 carries a vertically slidable member 82 which carries at its lower portion a pair of circumferentially displaced dial indicators 84 and 86. The vertically slidable adjustment of member 82 with respect to pivoted flap 78 permits the height of dial indicators 84 and 86 to be vertically adjusted. The stylus tips 88 of the respective dial indicators 84 and 86 are applied to two consecutive tooth flanks, and the deviations in the pitch of the gear are established by proceeding from one flank to the next. Uniform depth setting is assured by means of an adjusting screw 89 which passes through the lower portion of flap 78 and has its tip in abutting relation to the lower portion of a fixed member 76.

The accessory device 74 shown in Figs. 4–6, inclusive, can be used in a slightly modified manner to check the concentricity of the gear as shown in Fig. 7. The two dial indicators 84 and 86 used for measuring the pitch of the gear are replaced by a single dial indicator generally indicated at 90 equipped with a ball-ended stylus 92. Dial indicator 90 is supported by the lower end of the slidable portion 82 of the pivoted flap 80. A mandrel generally indicated at 94 having a ball handle 96 and an opposite ball end 98 is supported at the lower end of slidable portion 82 but is pivotally movable with respect thereto about a vertical axis 100. The ball handle 96 can be used for raising the pivoted flap 78 about its horizontal axis 80 and also for sensitively advancing the unit from one tooth to the next. The ball end 98 of the mandrel 94 is introduced into a toothed space. Turning the mandrel 94 around the axis 100 provides a small swivel motion until the desired checking position is reached.

Figs. 8–10 show the manner in which the testing apparatus may be used for checking the helix of a gear. A holder member generally indicated at 102 is connected to holder 38 at the outer end of radial support tube 28. A dial indicator 104 having a pivotally movable stylus tip 106 is supported by holder 102. Dial indicator 104 is vertically adjustable with respect to holder 102 and to the gear being tested by means of a screw member 105 positioned at the upper end of the holder. A slip gauge 107 may be used to accurately determine the extent of the vertical adjustment provided by adjusting screw 105. A horizontally disposed guide plate 108 is attached to holder 102 and is adapted to rest on the upper surface of rim 15 of the gear 12 being tested.

In checking the helix of the gear, a fixed stop member 110 is positioned on the upper surface of rim 15 of the gear at an accurately set distance from the center of the gear. A slip gauge 112 is placed between the fixed stop 110 and the face 114 of guide plate 108 which faces fixed stop 110. As the distance between the face 114 and the center line 116 of the test device is constant, the distance between the center line 116 and the fixed stop 110 can be calculated, knowing the dimensions of the slip gauge 112.

The helix test is performed as follows: the slip gauge 107 is so proportioned that the indicator stylus tip 106 is in proximity to one or the other flank of a tooth. The face 114 of the guide plate 108 is placed directly against the fixed stop 110. The dial indicator 104 is set to zero. The original slip gauge 107 is replaced by a slip gauge of a different length, and the dial indicator 104 and its stylus tip 106 are vertically displaced by the difference in the respective lengths of the original slip gauge 107 and the replacing slip gauge by a distance such as 20 millimeters, for example. This vertical or axial displacement of the stylus tip causes a pivotal movement of the stylus tip due to the helical contour of the tooth, which remains in engagement with the tooth flank during the axial movement, thereby displacing the indicator pointer from its zero setting.

The theoretically correct circumferential swivel motion corresponding to the axial displacement of the stylus is then calculated, based upon the specified helix of the gear. A suitable slip gauge 112 is selected in accordance with the calculated theoretically proper circumferential movement and is inserted between stop 110 and face 114. The insertion of slip gauge 112 imparts a circumferential movement to carrier 108 and to dial indicator 104. The tip of the stylus 106 remains in engagement with the tooth flank during this circumferential movement of dial indicator 104, the pivot point of the stylus moving relative to the stylus tip. The pointer movement is checked on dial indicator 104 with slip gauge 112 in position. If the helix conforms to its theoretically proper value, the pointer will return to zero with the slip gauge 112 in position. Any errors in the helix are indicated by deviations of the dial gauge pointer from the zero position. By the foregoing procedure, two points on the helix have thus been checked against the theoretically correct helix.

It will be seen from the foregoing that there is provided in accordance with this invention an improved gear testing apparatus which is suitable for use with either large or small gears and which is adapted to accommodate a plurality of accessory devices for performing different gear testing operations. The gear testing apparatus of the invention and its accessory attachments permit exact test measurements of such factors as the concentricity and pitch of the gear. During the testing operations, the gear testing elements are supported at a specified radial distance from the gear axis without canting of the test elements relative to the axis of the gear.

While there have been shown and described various embodiments of the invention, it will be obvious to those skilled in the art that various changes and modifications may be made therein without departing from the invention and, therefore, it is aimed in the appended claim to cover all such changes and modifications as fall within the true spirit and scope of the invention.

What I claim as my invention is:

Gear testing apparatus for performing a two flank rolling test comprising an arm, means for mounting said arm for pivotal movement about the axis of rotation of a gear to be tested, said arm extending radially of said gear, and a master gear holder mounted at the outer end of said arm, said master gear holder comprising a housing supported upon said arm at a fixed radial distance from the axis of rotation of the gear being tested, a flap member mounted within said housing for pivotal movement about an axis parallel to the axis of rotation of the gear being tested, means on said flap member for supporting a master gear for rotation about an axis parallel to the axis of rotation of the gear being tested, the pivotal axis of said flap member being located to one side of a plane containing the axes of rotation of the gear being tested and said master gear, and means biasing said flap member toward the gear being tested to resiliently maintain said master gear in mesh therewith.

References Cited in the file of this patent

UNITED STATES PATENTS

| | | |
|---|---|---|
| 1,304,592 | Olson | May 27, 1919 |
| 1,326,696 | Simmons | Dec. 30, 1919 |
| 1,663,085 | Logue | Mar. 30, 1928 |
| 1,924,405 | Hughes | Aug. 29, 1933 |
| 2,564,376 | Schwartz | Aug. 14, 1951 |
| 2,697,283 | Leuthold | Dec. 21, 1954 |

FOREIGN PATENTS

| | | |
|---|---|---|
| 344,334 | Germany | Nov. 19, 1921 |
| 346,805 | Germany | Jan. 5, 1922 |
| 601,612 | Germany | Aug. 20, 1934 |